W. G. ALLEN.
BARBED FENCE WIRE.
No. 178,581. Patented June 13, 1876.
Fig. 1.
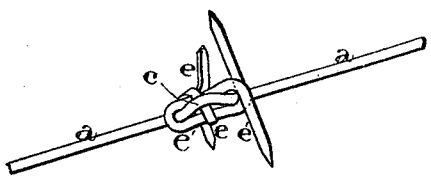
Fig. 2.
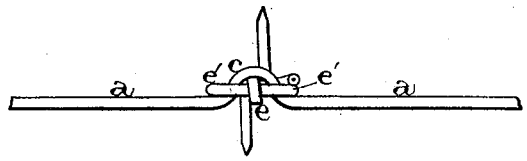
Fig. 3. Fig. 4.
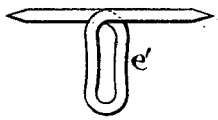 
WITNESSES.
INVENTOR.
Wm. G. Allen
per
F. A. Lehmann, Atty.

UNITED STATES PATENT OFFICE.

WILLIAM G. ALLEN, OF NEVADA, IOWA.

IMPROVEMENT IN BARBED FENCE-WIRE.

Specification forming part of Letters Patent No. 178,581, dated June 13, 1876; application filed March 8, 1876.

*To all whom it may concern:*

Be it known that I, WILLIAM G. ALLEN, of Nevada, in the county of Story and State of Iowa, have invented certain new and useful Improvements in Barb-Fences; and I do hereby declare the following to be a full, clear, and exact description of the invention, such as will enable others skilled in the art to which it pertains to make and use it, reference being had to the accompanying drawings, which form part of this specification.

My invention relates to an improvement in barbed-wire fences; and it consists in making a slight bend or curve in the wire that forms the fence, and then forming the barb out of two short pieces of wire, and bending and interlocking them around the bend or curve in such a manner as to secure them firmly in position, while their ends project straight out, as will be more fully described hereinafter.

The accompanying drawings represent my invention.

$a$ represents one of the wires of a fence, which has, at every place where it is desired to attach a barb, a bend, crook, or curve, $c$, formed in it. The barb itself is formed of two separate and distinct pieces of wire, $e\ e'$, which are wrapped around this bend, crook, or curve $c$ at right angles to each other, as shown, so as to interlock and be securely held in position, while their sharpened ends project outward, so as to keep away cattle and horses.

By means of the bends or crooks $c$ the barbs are prevented from being moved along the wire, and they can be firmly and securely lodged and braced in position and applied to any wire fence now in use.

Having thus described my invention, I claim—

1. The wire-fence barb $e$, secured in position upon the wire $a$, provided with the bent portions $c$ by means of the loop $e'$, which surrounds the bent portion between the fence-wire and barb, substantially as shown.

2. The combination, with the fence-wire $a$ having the crook or bends $c$, of the two pieces of pointed wire, $e\ e'$, wrapped and interlocked around the bends $c$, substantially as shown and described.

In testimony that I claim the foregoing I have hereunto set my hand this 29th day of February, 1876.

WILLIAM G. ALLEN.

Witnesses:
 N. A. COLE,
 M. C. ALLEN.